United States Patent [19]

Peddie

[11] 4,326,902

[45] Apr. 27, 1982

[54] METHOD FOR ULTRASONICALLY WELDING COMPOSITE STRUCTURES

[75] Inventor: Gerald D. Peddie, Bonita, Calif.

[73] Assignee: General Dynamics, Convair Division, San Diego, Calif.

[21] Appl. No.: 158,931

[22] Filed: Jun. 12, 1980

[51] Int. Cl.[3] ........................ B29C 27/08; B32B 31/20

[52] U.S. Cl. .................................. 156/73.1; 156/290; 264/23

[58] Field of Search ..................... 156/73.1, 73.4, 290, 156/308.4; 228/110, 1 R; 264/23; 428/33, 43; 206/820

[56] References Cited

U.S. PATENT DOCUMENTS 3,164,250 1/1965 Paxton ................................ 206/820

3,765,973 10/1973 Kramer ............................. 156/73.1

3,874,963 4/1975 Barger ............................... 156/73.4

OTHER PUBLICATIONS

*Adhesives Age.* "Joining the 'Engineering Plastics'", Petrie, E. M., Aug. 1980, pp. 14–23.

*Primary Examiner*—Michael G. Wityshyn

*Attorney, Agent, or Firm*—John R. Duncan; Frank D. Gilliam

[57] ABSTRACT

An ultrasonic welding energy concentrating chain comprising a plurality of relatively flat members integrally formed from a flat stock of energy concentrating material having a predetermined thickness and joined together adjacent their peripheries by integral portions to interconnect adjacent members into a longitudinally extending chain, said integral portions being formed as to permit each manual separation of adjacent members, said members being adapted to being interposed between sheets of thermoplastic material and upon application of ultrasonic energy to the sandwich of thermoplastic sheets, the shape of the weld of such thermoplastic sheets generally approximating the shape of said flat members.

A method of ultrasonically welding together two or more thermoplastic material members comprising interposing an energy concentrating member between the two or more members to form a sandwich structure, subjecting the sandwich structure to sufficient pressure to bring said energy concentrating member and two or more members into intimate contact sufficient to permit ultrasonic welding, and applying sufficient ultrasonic energy to the sandwich structure for sufficient time to cause the two or more thermoplastic material members to be welded together.

7 Claims, 5 Drawing Figures

56

58

60

METHOD FOR ULTRASONICALLY WELDING COMPOSITE STRUCTURES

BACKGROUND OF THE INVENTION

This invention relates to improvements in methods and devices for ultrasonically welding composite structures and more particularly but not by way of limitation to interposing a flat energy concentrating member having a predetermined thickness and shape between two or more sheets of thermoplastic material prior to the application of ultrasonic energy to the sandwich of thermoplastic material and flat member to weld said thermoplastic material and flat member to weld said thermoplastic sheets together.

As further commercial and military space programs are contemplated it is becoming increasingly desirable to construct large structural arrays in various configurations. The material required for such arrays requires a combination of high stiffness/density and thermo-dimensional stability to minimize the dynamic excitation and distortion of such large arrays in orbit as they enter and leave the shadow of the earth. The properties, plus lightweight, make graphite fiber composite materials a natural choice over metallic materials.

For fabrication in space, graphite theremoplastics are of particular interest since this material can be heat laminated into continuous flat sheet stock on earth and indefinitely stored in reels or cassettes without refrigeration, which is required for uncured thermoset materials. The thermoplastic materials in the form of flat rolled strips can be compactly stored and sent into space orbit for fabrication and assembly in space. Full payloads are also achieved for transfer into orbit since the compact storage of construction materials during transfer permits adherence to transport center of gravity constraints.

Flat strips can be readily formed into structural shapes such as "U" channels, "I" beams, and variations of standard shapes. The strip material can be heat softened and then restored to its full rigidity during a cool down stage. Also, unlike the thermoset-graphite composites, structural shapes from graphite/thermoplastic can be joined to each other by the use of ultrasonic energy. Thus, undesirable in-space outgassing and the need for fasteners or materials are eliminated.

At present ultrasonic forming and welding of graphite thermoplastic materials appears to offer the most advanced and innovative approach to simple, highly efficient and reliable system for forming and assembling large space structures in orbit. Ultrasonic welding while showing the potential for the required high strength has in the past suffered from certain defects which have precluded producing welds having sufficient uniformity. Extensive experiments have been conducted to determine the effect of pressure, weld power, and time of the weld joint. It was found that typical weld nodes exhibit an interesting phenomenon. While bonds could be achieved using power settings from 350 to 1050 watts and pressures from 10 to 80 psi it was found that center of the weld area was burnt with no weld bond area and that the only area of actual weld bond was in a circle surrounding the burnt center area. This phenomenon also occurred at welding length times from 0.2 seconds to 2.0 seconds. Continued experiments revealed that weld time beyond a certain point was not contributing to weld improvement but was actually causing increased weld deterioration. This shortcoming has now been overcome by the present invention as will now be described in detail.

SUMMARY OF THE INVENTION

The present invention contemplates ultrasonically welding together two or more thermoplastic material members by interposing an energy concentrating or concentrator member between the thermoplastic material members to form a sandwich structure, subjecting the sandwich structure to sufficient pressure to bring said energy concentrating member and two or more members into intimate contact sufficient to permit ultrasonic welding, and thereafter applying sufficient ultrasonic energy to the composite sandwich structure for sufficient time to cause the thermoplastic members to be welded together. The energy concentrating member is taken from a chain comprising a plurality of relatively flat members integrally formed from a flat stock of energy concentrating material having a predetermined thickness and shape and joined together adjacent their peripheries by integral portions to interconnect adjacent members into a longitudinally extending chain, said integral portions being formed as to permit easy manual separation of adjacent members. An energy concentrating member is interposed between the sheets of thermoplastic material to start a weld of the two or more thermoplastic sheets with the shape of the weld area of the thermoplastic sheets generally approximating the shape of the initial energy concentrating member interposed between said sheets.

DETAILED DESCRIPTION OF THE PREFERRED EMBODIMENT

Throughout the drawings and specifications, the same numerals are used in the various figures to indicate the identical element or part.

Figure 1:
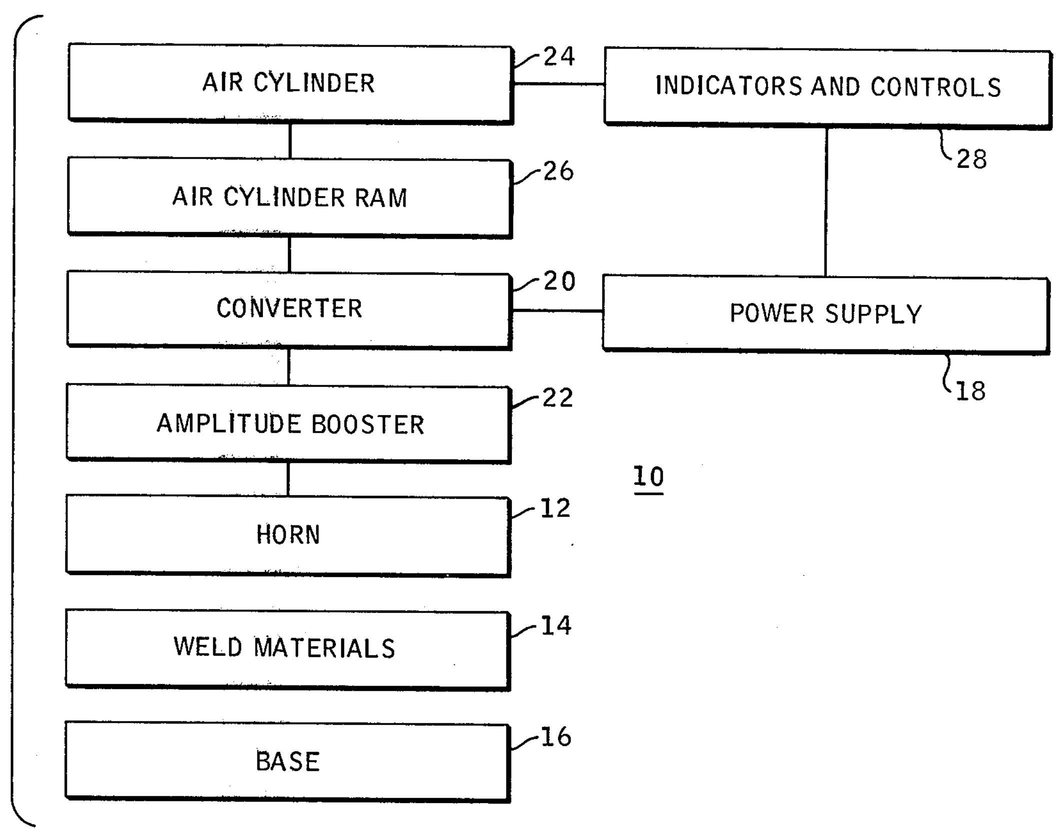
FIG. 1 is a simplified block diagram of an ultrasonic welding system utilized in the present invention.

Referring now to FIG. 1, reference character 10 refers to a simplified ultrasonic energy welding system used in the practice of the present invention, The system 10 includes a suitable ultrasonic welding horn 12 which contacts weld materials 14 with a variable pressure against base 16 to ultrasonically weld the materials together as will be described in greater detail hereinafter.

The ultrasonic welding system is provided with a power supply 18 which provides a source of electrical energy that is coupled to a piezoelectric converter 20. The converter 20 changes the electrical energy into mechanical energy to provide the various (5 to 80 thousand) cycles per second vibratory action at the tip of the horn 12. The converter 20 is coupled through a suitable amplitude booster 22 to the horn 12 and increases or decreases the amplitude of the mechanical energy delivered to the horn 12 by a gain factor of $1\times0.4$ to $1\times2.5$. The horn 12 then transfers the mechanical vibratory energy from the converter 20 to the weld materials 14.

An air cylinder 24 stores a predetermined air pressure and transfers that pressure to an air cylinder ram 26 that in turn couples that same pressure to the welder system components, the converter 20, the amplitude booster 22, and the welding horn 12.

Suitable indicators and controls, shown generally at 28, are coupled to the power supply 18 and to the air cylinder 24. These indicators and controls may include, by way of example and not by way of limitation, the following:

a. A weld time control to govern the time span of ultrasonic vibrations being applied to the materials being welded.

b. A hold time control to govern the time the weld materials 14 are held under a predetermined force from the air cylinder 24 and ram 26 following the ultrasonic weld time cycle. This control allows the weld materials 14 sufficient time under pressure to cool down prior to removal.

c. A load meter indicates the maximum level of power transmitted to the weld materials 14 during the time ultrasonic energy is being applied to the weld area.

d. A pressure indicator visually shows the amount of gas pressure in the air cylinder 24.

e. A pressure control provides for adjustment of the pressure cylinder 24 prior to welding.

f. Various on-off switches and indicators are also provided.

While an air cylinder 24 has been shown it would be within the scope of the present invention to provide other pressure means to accomplish the same purpose.

Figure 2:
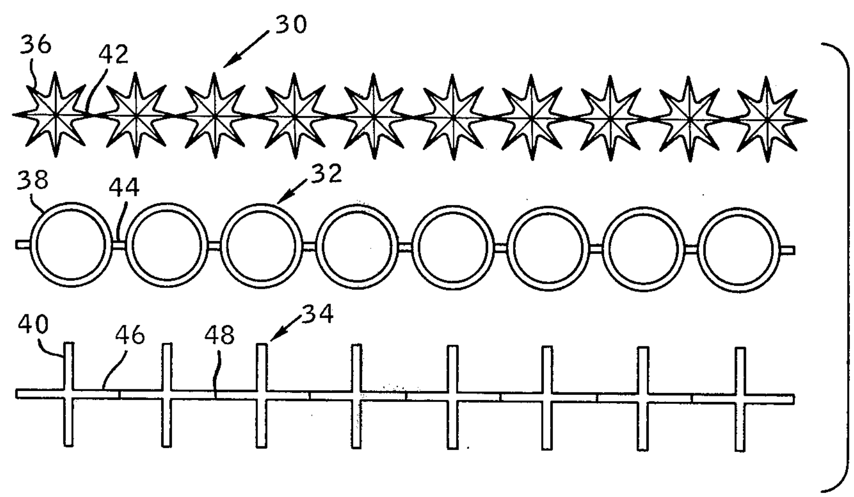
FIG. 2 is a plan view of three chains of ultrasonic welding energy concentrating members embodying the present invention and illustrating representative shapes (but not limited to these shapes) of concentrating members that may be employed.

Referring now to FIG. 2, three chains of ultrasonic welding energy members are shown. Each of the three chains 30, 32, and 34 are formed as a plurality of relatively flat members 36, 38, and 40 that are integrally formed from a flat stock of energy concentrating material having a predetermined thickness and joined together adjacent their peripheries by integral portions 42, 44, and 46 respectively, to interconnect adjacent members 36, 38, and 40. The integral connecting portions 42, 44, and 46 are formed as to permit easy manual separation of adjacent members 36, 38, and 40 as desired. The integral portions 42, 44, and 46 may be provided with depressed portions, as shown generally at 48, in FIG. 2 as necessary to ensure each of manual separation.

Figure 4:
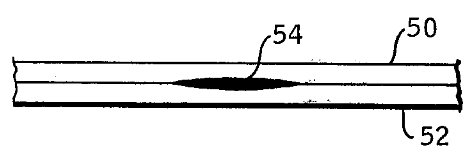
FIG. 4 is a sectional view illustrating a typical weld node produced when one of the ultrasonic welding energy concentrating members of the present invention is interposed between two sheets of thermoplastic material and welded according to the present invention.

Referring now to FIG. 4, it will be seen that two or more sheets 50 and 52 of thermoplastic material to be welded together by ultrasonic energy are positioned together to permit the opposing faces of said materials 50 and 52 to be placed into intimate contact with each other. An ultrasonic energy concentrating member, for example 38, is manually removed from the chain 32 and interposed between the thermoplastic material members 50 and 52 to form a composite sandwich of weld materials as seen in FIG. 1.

The composite sandwich of weld materials 14 is then subjected to a force applied by the air cylinder ram 26 and to ultrasonic energy applied by the horn 12. As mentioned previously the ultrasonic energy is applied at various cycles per second and for a period of approximately 0.15 seconds for the specific example discussed. It was found that while state of the art ultrasonic systems typically use a pressure in the order of 1050 psi it was found in the present invention that acceptable welds could be produced with pressures as low as 350 psi.

Figure 3:
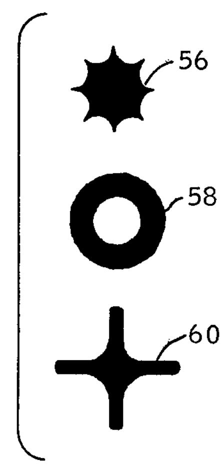
FIG. 3 is a plan view illustrating shapes of weld areas that are produced by employing the ultrasonic energy concentrating members shown in FIG. 2.

It will be seen in FIG. 4 that a weld nugget 54 is then formed, upon completion of the ultrasonic welding operation, between the sheets of thermoplastic material 50 and 52 to weld them together. This weld nugget 54 will be generally the shape of the energy concentrating member 38. FIG. 3 illustrates weld nuggets 56, 58, and 60 that correspond to the energy concentrating shapes 36, 38, and 40. Thus, the use of the energy concentrating member, for example 38, between the sheets of thermoplastic material 50 and 52 provides a means to achieve controllable and repeatable weld nugget 54 having a shape 58 and that avoids the burned out center phenomenon seen previously in ultrasonic welding of thermoplastic materials.

Figure 5:
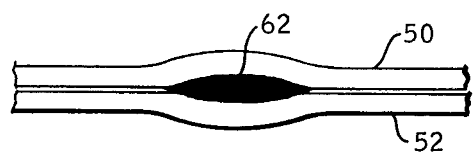
FIG. 5 is a sectional view, similar to FIG. 4, illustrating a weld node produced when a very large ultrasonic welding energy concentrating member is interposed between two sheets of thermoplastic material and ultrasonically welded according to the present invention.

Also it has found that producing repeatable acceptable welds by use of the present invention permits using a minimum of energy. For example, ½" weld nodes have been produced by applying a maximum 10 pound load while using only 75 watts of actual weld power. Referring to FIG. 5, it will be seen that a large weld nugget 62 is produced between the two sheets of thermoplastic material 50 and 52 when an energy concentrator having a predetermined thickness greater than the one used for the welding operation shown in FIG. 4. Since the size and shape of the weld nugget is determined by the size and shape of the energy concentrating member, it is possible to use a single universal welding horn 12 to produce various sizes and shapes of weld nuggets.

Thus, once the particular strength of a joint has been determined the weld node shape to satisfy such requirement can be predetermined by the size and shape of the energy concentrating member. While the material from which the energy concentrator chain is formed may be the same material as the two sheets of thermoplastic material, it is not necessary that the material be the same so long as it meets the requirement of being able to be melted by the application of ultrasonic energy and form an acceptable weld nugget with the two or more sheets of thermoplastic material as previously described hereinabove. The material of the energy concentrating member may also be colored or clear, as desired, in order to contrast clearly with the two sheets of thermoplastic material to be welded together so that the shape of the resultant weld nugget may be easily examined.

Some of the requisites for a specific high speed continuous material forming system (i.e., large space structures) would include heat distortion temperatures above 300 degrees Fahrenheit, heat formability in the temperature range from 350 to 550 degrees Fahrenheit, and nonburning. A polysufone thermoplastic resin system reinforced with various unidirectional graphite fiber systems has been found to be the material which met the requirements for such a system more than any other ones known at present.

Although the foregoing invention has been described in some detail by way of illustration and example for the purpose of clarity of understanding, it should be understood that certain changes and modifications may be practical within the scope of the invention as limited only by the scope of the appended claims.

What is claimed as new and useful and desired to be secured by United States Letters Patent is:

1. A method of ultrasonically welding together two or more sheets of thermoplastic material members of selected thickness by the formation of a discrete weld nugget therebetween comprising the steps of:

interposing an energy concentrating member of a color contrasting with the color of said sheets of thermoplastic members between the thermoplastic members to form a sandwich structure;

subjecting the sandwich structure to sufficient pressure to bring said energy concentrating member and thermoplastic material members into intimate contact sufficient to permit ultrasonic welding;

applying sufficient ultrasonic energy to the sandwich structure for sufficient time to cause the thermoplastic material members to be welded together at said energy concentrating member; and visually inspecting the weld nugget through the sheets of thermoplastic material members to insure that it takes the shape of said energy concentrating member thereby insuring a satisfactory weld joint.

2. The method of ultrasonically welding together two or more thermoplastic material members according to claim 1 wherein the strength of the weld between said thermoplastic members is determined by the shape of the energy concentrating member.

3. The method of ultrasonically welding together two or more thermoplastic material members according to claim 1 wherein the size and shape of the weld node between the thermoplastic materials is determined by the size and shape of the energy concentrating members.

4. The method of ultrasonically welding together two or more thermoplastic material members according to claim 1 wherein the energy concentrating member is composed of a thermoplastic material.

5. The method of ultrasonically welding together two or more thermoplastic material members according to claim 1 wherein the ultrasonic energy is applied by a single welder horn and the shape of the weld node is determined by the shape of the energy concentrating member.

6. The method of ultrasonically welding together two or more thermoplastic material members according to claim 1 wherein the thickness of the weld node is determined by the thickness of the energy concentrating member.

7. The method of ultrasonically welding together two or more thermoplastic material members according to claim 1 wherein a plurality of differently shaped weld nodes are formed by a single welding horn by interposing differently shaped energy concentrating members in the interfaces between the thermoplastic materials.

* * * * *